(12) United States Patent
Bumgardner et al.

(10) Patent No.: US 8,528,015 B2
(45) Date of Patent: Sep. 3, 2013

(54) RESOURCE SHARING SYSTEM OF SET-TOP BOXES

(75) Inventors: Jim Bumgardner, Shadow Hills, CA (US); Haig H. Krakirian, Burbank, CA (US)

(73) Assignee: Aptiv Digital, Inc., Burbank, CA (US)

( * ) Notice: Subject to any disclaimer, the term of this patent is extended or adjusted under 35 U.S.C. 154(b) by 1045 days.

(21) Appl. No.: 10/708,529

(22) Filed: Mar. 10, 2004

(65) Prior Publication Data

US 2005/0102698 A1    May 12, 2005

Related U.S. Application Data

(60) Provisional application No. 60/517,842, filed on Nov. 6, 2003.

(51) Int. Cl.
*G06F 3/00* (2006.01)
*H04N 7/18* (2006.01)
*H04N 7/173* (2011.01)

(52) U.S. Cl.
USPC .............. 725/37; 725/74; 725/92; 725/115

(58) Field of Classification Search
USPC .................................... 725/134, 80
See application file for complete search history.

(56) References Cited

U.S. PATENT DOCUMENTS

| | | | | |
|---|---|---|---|---|
| 4,063,220 A | * | 12/1977 | Metcalfe et al. | 370/462 |
| 5,630,067 A | * | 5/1997 | Kindell et al. | 709/231 |
| 5,671,225 A | * | 9/1997 | Hooper et al. | 370/468 |
| 5,940,387 A | * | 8/1999 | Humpleman | 370/352 |
| 6,094,680 A | * | 7/2000 | Hokanson | 709/223 |
| 6,678,737 B1 | * | 1/2004 | Bucher | 709/231 |
| 6,725,253 B1 | * | 4/2004 | Okano et al. | 709/203 |
| 6,789,204 B2 | * | 9/2004 | Abdelnur et al. | 726/1 |

(Continued)

FOREIGN PATENT DOCUMENTS

| | | | |
|---|---|---|---|
| EP | 1355496 | * | 10/2003 |
| EP | 1355496 A2 | * | 10/2003 |

(Continued)

OTHER PUBLICATIONS

Monaco F.J. et al., "Remote Device Command Resource Sharing over the Internet", IEEE Transaction on Computers, Jul. 2002.*

(Continued)

*Primary Examiner* — Chris Parry
*Assistant Examiner* — James R Marandi
(74) *Attorney, Agent, or Firm* — Ropes & Gray LLP

(57) ABSTRACT

The present invention is directed to a resource sharing system of set-top boxes. The set-top boxes are arranged in a network. The resources of each set-top box in the network are potentially available to another set-top box in the network that has run out of resources. When a user needs a tuner resource, the set-top box determines if it has a local tuner available. If not, the set-top box attempts to use the tuner of another set-top box in the network. In one embodiment all of the tuners in the network are pooled together and used as a global resource of tuners for all of the set-tops. Alternatively, if a set-top box runs out of resource space on a storage device, it attempts to use the storage device on another set-top box before deleting shows locally to make room for the new show.

22 Claims, 13 Drawing Sheets

(56) References Cited

U.S. PATENT DOCUMENTS

| | | | |
|---|---|---|---|
| 7,027,460 B2* | 4/2006 | Iyer et al. | 370/429 |
| 7,493,646 B2 | 2/2009 | Ellis | |
| 7,761,892 B2 | 7/2010 | Ellis et al. | |
| 7,773,859 B1 | 8/2010 | Potrebic et al. | |
| 2002/0152311 A1* | 10/2002 | Veltman et al. | 709/227 |
| 2002/0184451 A1* | 12/2002 | Dovi | 711/148 |
| 2003/0009587 A1* | 1/2003 | Harrow et al. | 709/238 |
| 2003/0204848 A1* | 10/2003 | Cheng et al. | 725/58 |
| 2003/0204856 A1* | 10/2003 | Buxton | 725/120 |
| 2004/0163130 A1* | 8/2004 | Gray et al. | 725/132 |
| 2006/0140584 A1 | 6/2006 | Ellis et al. | |
| 2007/0071399 A1 | 3/2007 | Ellis | |

FOREIGN PATENT DOCUMENTS

| | | |
|---|---|---|
| JP | 11-136615 | 5/1999 |
| JP | 11-313280 | 11/1999 |
| JP | P2004-7592 A | 1/2004 |
| JP | P2004-23326 A | 1/2004 |

OTHER PUBLICATIONS

Gong Li, "A Software Architecture for Open Service Gateways", IEEE Internet Computing, Jan.-Feb. 2001.*

Jaeger Rudolf, "Set-Top Box Software Architecture for Digital Video Broadcast and Interactive Services", IEEE, 2001.*

Bill Wittress et al, "Internet Protocol (IP) Set-Top Boxes", Microsoft, Sep. 2003.*

* cited by examiner

RESOURCE SHARING SYSTEM OF SET-TOP BOXES

CROSS REFERENCE TO RELATED APPLICATIONS

This Application claims priority to Provisional Application Entitled Resource Sharing System of Set-Top Boxes Filed Nov. 6, 2003, Application No. 60/517,842.

COPYRIGHT STATEMENT

All of the material in this patent document is subject to copyright protection under the copyright laws of the United States and of other countries. Portions of the material in this patent document are also subject to protection under the maskwork registration laws of the United States and of other countries. The owner of the copyright and maskwork rights has no objection to the facsimile reproduction by anyone of the patent document or the patent disclosure, as it appears in the United States Patent and Trademark Office file or records, but otherwise reserves all copyright and maskwork rights whatsoever.

BACKGROUND OF INVENTION

1. Field of the Invention

The present invention relates generally to systems that allow users to watch television shows and to schedule and save television shows to watch later.

2. Background of the Invention

Set-top boxes are electronic devices that generally are connected to or incorporated within televisions or computer monitors. They take a broadcast signal as input, for instance via a cable line or satellite wave, and transform the signal into audio and video information that allows a user to watch and enjoy broadcast programming. Most set-top boxes operate with an input device such as a remote control and also have a keypad or other integrated input device as well. In its most basic form a set-top box is used to receive broadcast signals, change channels, and browse through the available programs to find a show to watch.

A set-top box may be viewed as being comprised of resources. One resource is a tuner. The tuner is a hardware component that makes it possible, in part, to transform the signal received on a cable line or at an antenna, into a viewer usable form, such as a series of still images that are repeatedly displayed on the screen of the attached output device. It is the rapid display of the series of still images that causes the user to perceive a moving, changing television picture that is commonly known and understood to all people that watch television. Some set-top boxes comprise multiple tuners that allow the user to watch multiple shows simultaneously, such as with picture-in-picture enabled set-top boxes.

More recently, storage devices, such as hard drives, have been added to set-top boxes, which also are a resource that is available to a user of the set-top box. Typically, the storage device allows the user to save shows and watch them later, similar to the manner in which a user records shows with a VCR or DVD-R. When used in conjunction with an interactive program guide, the user is presented with a graphical user interface where they are able to browse current and future listings of shows and easily select the shows they want the set-top box to automatically save to the storage device later.

When the time comes for the set-top box to save the show, the set-top box needs to use one tuner and at least part of the storage device to perform the function. In a two tuner set-top box, this means the box could be used to save one show, while simultaneously allowing the user to watch a show on another channel before its tuner resources are exhausted. Similarly, a two-tuner system would allow the user to simultaneously save shows to the storage device on two different channels at overlapping time slots. In either case, such actions could quickly exhaust the available space on the storage device and the available tuners.

One solution to this problem is to make set-top boxes with more tuners and larger storage devices. By increasing the resources it becomes less likely that they will be quickly exhausted. This approach, however, is problematic for several reasons. First, the set-top boxes become more costly when they have their resources enhanced. From a consumer's perspective, this is unacceptable because they are often not willing to pay large amounts of money for set-top boxes. From a manufacturer's or distributor's perspective this is unacceptable as well, because the consumer is usually renting the set-top box and the manufacturer or distributor does not want to risk a lot of money in the case of a broken or not-returned set-top. Therefore, the usual solution is to continue providing stripped down versions of set-top boxes with a minimal size hard drive and no more than two tuners. Therefore, it is easy for a conventional set-top box to quickly run out of resources that are available to the user.

SUMMARY OF INVENTION

The present invention is directed to a resource sharing system of set-top boxes. The set-top boxes are arranged in a network. The resources of each set-top box in the network are potentially available to another set-top box in the network that has run out of resources. In one embodiment the resource is a tuner. When a user needs a tuner resource, the set-top box determines if it has a local tuner available. If not, the set-top box attempts to use the tuner of another set-top box in the network. In one embodiment all of the tuners in the network are pooled together and used as a global resource of tuners for all of the set-tops.

In another embodiment, the resource is a storage device. If a set-top box runs out of space on the storage device, it attempts to use the storage device on another set-top box before deleting shows locally to make room for the new show. In one embodiment, the set-top box network performs a load-balancing function, where a first set-top box looks for the connected storage device that has the most available space in the whole network and uses that resource, regardless of whether the first set-top box has a hard drive that is full or not. In another embodiment, a resource is used in a box that is turned off first before attempting to use resources in set-top boxes that are turned on.

In one embodiment, the tuner is obtained for recording by searching for what tuners are available on the network and prioritizing the available tuners by their type and selecting the highest priority tuner. For instance, in one embodiment, each set-top box has a background and a foreground tuner. The box a current user is operating is considered a local box while all others are considered remote. Thus, the tuners are prioritized as follows: background remote tuners take precedence over background local tuners, which take precedence over remote foreground tuners, which take precedence over local foreground tuners. In another embodiment, remote user intervention or non-response is required to obtain a remote foreground tuner.

BRIEF DESCRIPTION OF DRAWINGS

The invention will be more fully understood by reference to the following drawings, which are for illustrative purposes only.

DETAILED DESCRIPTION

The present invention is directed to a resource sharing system of set-top boxes. A set-top box is a device that is connected to or incorporated within an output device, such as a television set or computer monitor. The set-top box typically has the functionality of a computing device, including a processor that is controlled by software or firmware and a storage device that includes any or all of a combination of hard drives, random access memory (RAM), read only memory (ROM), flash memory, caches, and buffers. The set-top box takes a broadcast signal as input, for instance from an antenna or cable line, and transforms the broadcast signal into output that allows a user to watch television. The set-top box also stores the broadcast signal on a storage device, when instructed, and retrieves the signal at an appropriate time and transforms it into viewer-usable output on the output device.

Figure 1:
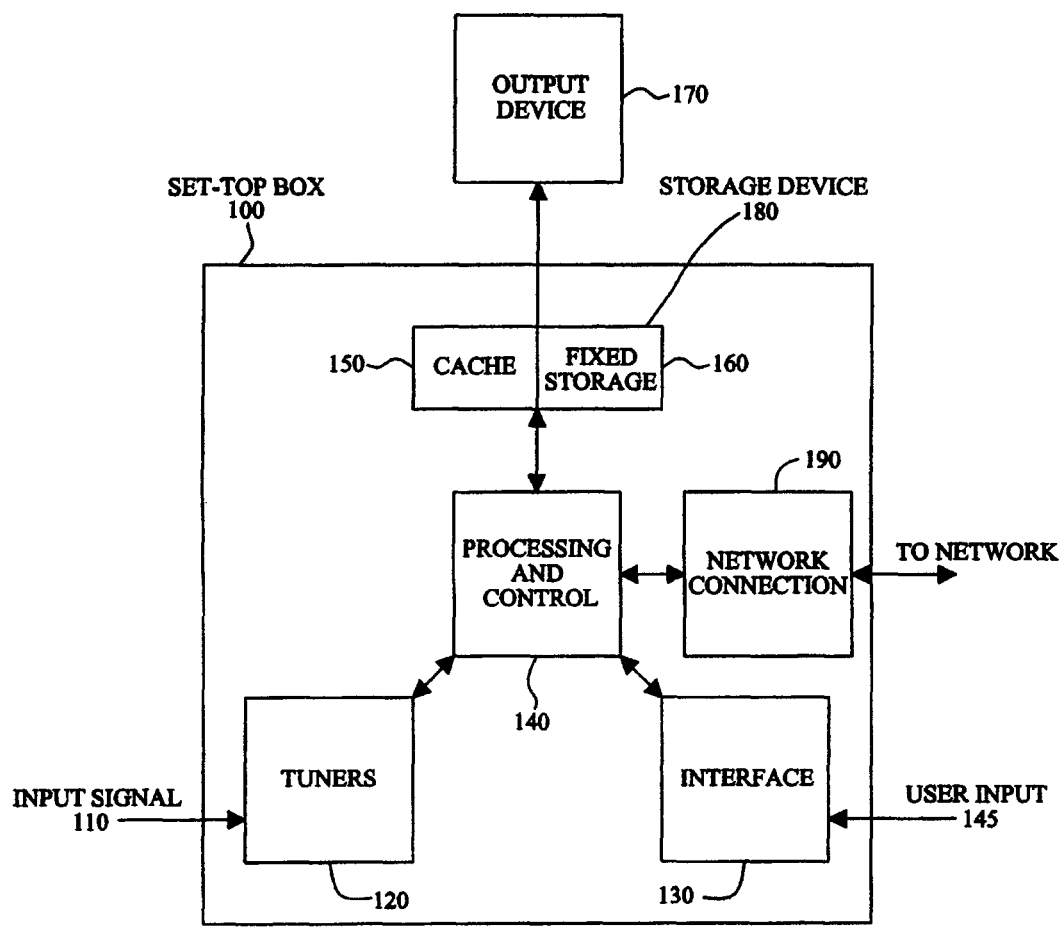
FIG. 1 is a functional block diagram of an embodiment of a set-top box.

Referring more specifically to the drawings, FIG. 1 is a functional block diagram of some of the main components of a typical set-top box according to an embodiment of the present invention. It should be noted by one skilled in the art, that there are components (not shown) of set-top box 100 of FIG. 1 that also may be included, but have been omitted for purposes of simplicity. Set-top box 100 receives an input signal 110 from an outside source, such as an antenna that receives a satellite signal or a cable line that is connected to a box and supplied from a service provider. The input signal is received by tuners 120, which in conjunction with processing and control block 140 transfers some or all of the input signals 110 to a storage device 180. Set-top box 100 also includes a network connection 190 where a connection to a network of other set-top boxes is made.

Storage device 180 then facilitates the presentation of the stored input signal 110 at an output device 170, such as a television set or a computer monitor. A user controls set-top box 100 by providing user input 145 to an interface 130. Interface 130, includes a remote interface and/or a keyset attached to the set-top box. A remote interface might be, for instance an infrared or remote frequency interface used in conjunction with a typical remote control. Processing and control block 140 includes some or all of a combination of computer software, micro-processors, firmware, etc. Processing and control block is used, for instance, to facilitate responses to user input 145, input signals 110, and to control the manner in which storage device 180 receives data either in a cache 150 or a fixed storage 160.

Typically, if a user is watching live television a portion of the input signal 110 is temporarily stored in cache 150 before being output to device 170. In this manner, time-delayed live television is implemented where a user can pause and rewind delayed live television signals by altering the current output position in the cache 150. Alternatively, processing and control block 140 might receive a command from user input 145 to store a show for a longer period of time, in such case input signals 110 are directed to fixed storage 160.

Figure 2:
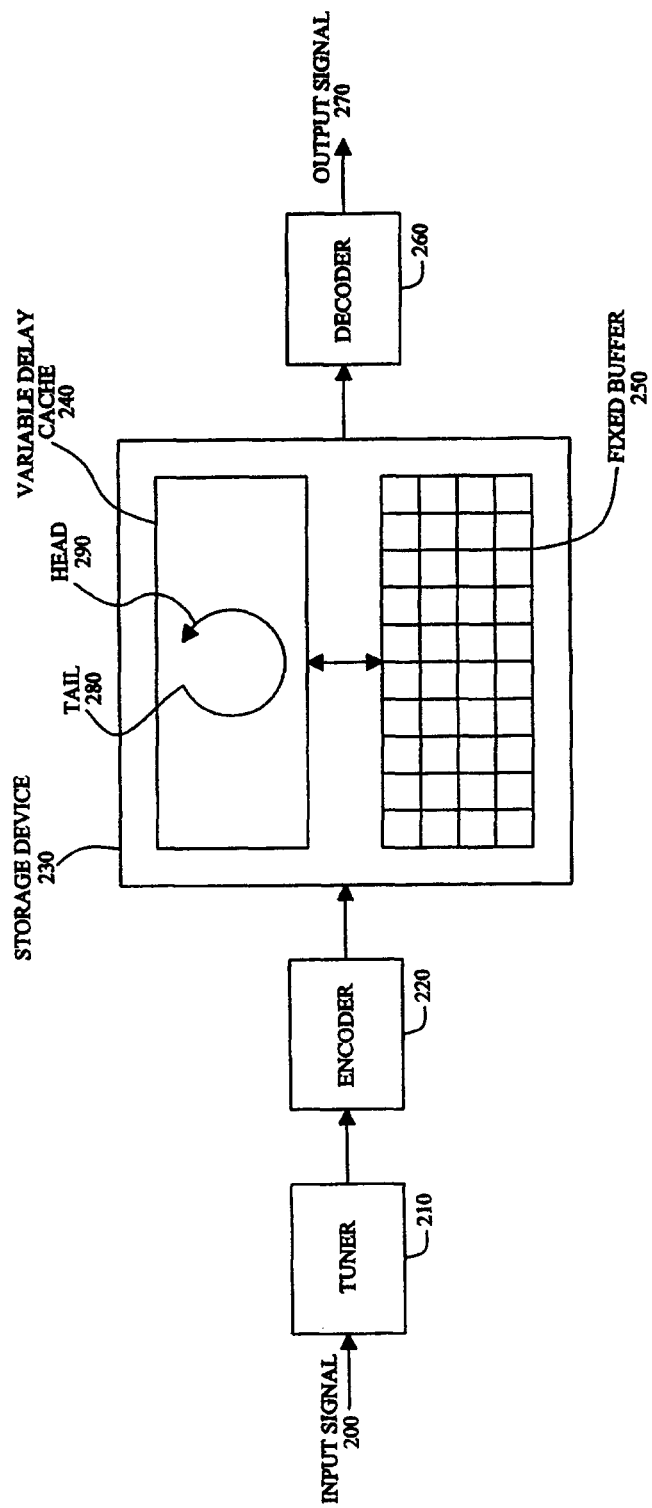
FIG. 2 is a functional block diagram of some of the components of one embodiment of a set-top box.

The operation of one embodiment of a set-top box is shown in FIG. 2. An input signal 200 arrives at tuner 210 and is encoded at block 220. A storage device 230 comprises a variable delay cache 240 and a fixed buffer 250. If the user is watching live television, the input signal 200 is typically handled first in variable delay cache 240. In this example, variable delay cache has a structure that is logically circular. The size of the cache controls the amount of delay. As signals are received in the cache 240 they are added to the tail 280 of the cache 240.

As new signals are received, they eventually move to the head 290 of the cache 240. At that time, they are decoded at block 260 and transferred as an output signal 270 to an output device such as a television, for instance. The delay between the head 290 and the tail 280 is adjustable or can be completely eliminated to have a true live television experience. Variable delay cache 240 is shown being a circular buffer, however, the actual locations in the storage device 230 need not be contiguous. Instead, they can be in disparate locations on storage device 230 and connected, for instance using pointers or other memory reference techniques, so that there is an ability to produce the data in a logical manner, but an actual contiguous space in storage device 230 need not be reserved for the variable delay cache 240.

Figure 3:
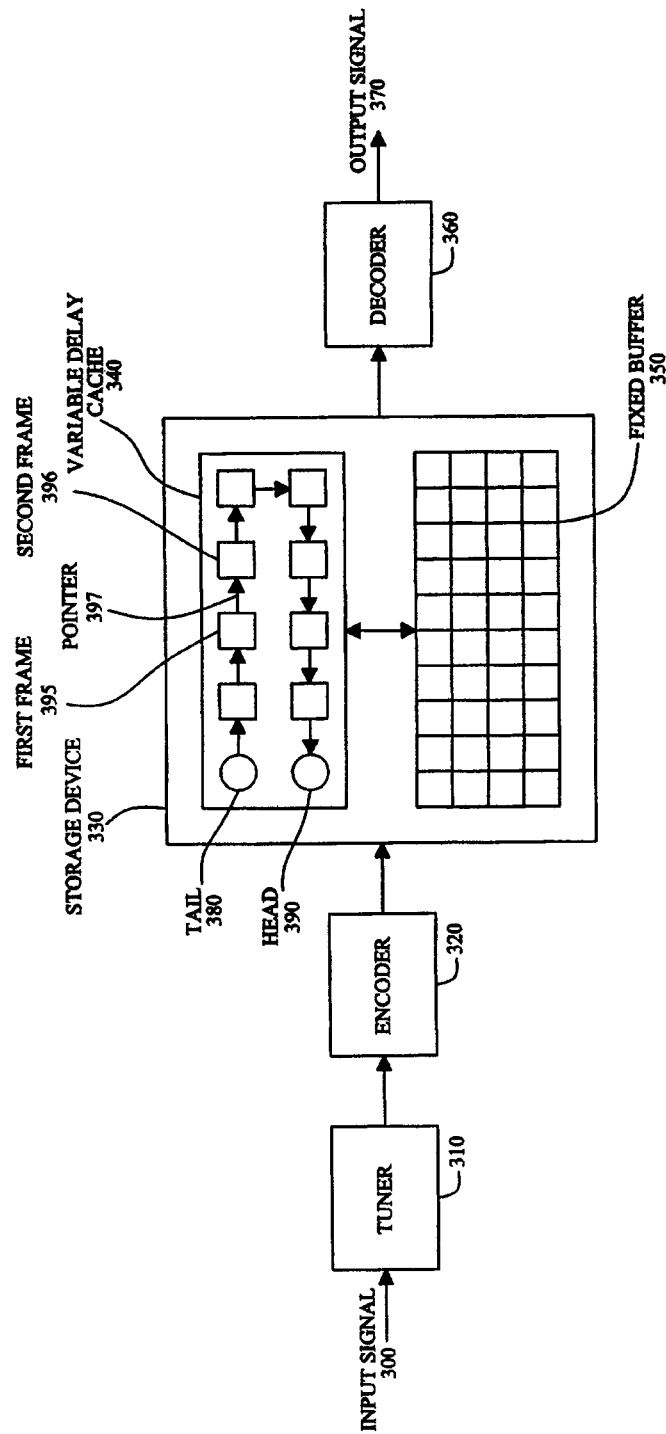
FIG. 3 is a functional block diagram of some of the components of one embodiment of a set-top box.

FIG. 3 shows the operation of a set-top according to another embodiment of the present invention. An input signal 300 arrives at tuner 310 and is encoded at block 320. A storage device 330 comprises a variable delay cache 340 and a fixed buffer 350. If the user is watching live television, the input signal 300 is handled first in variable delay cache 340. In this example, variable delay cache has a structure that is a linked list of files wherein each file represents one or more frames of the video that arrives along input signal 300. The size of the linked list controls the amount of delay. As signals are received in the cache 340 they are added to the tail 380 of the cache 340.

As new signals are received, they eventually move to the head 390 of the cache 340. At that time, they are decoded at block 360 and transferred as an output signal 370 to an output device such as a television, for instance. The delay between the head 390 and the tail 380 is adjustable or can be completely eliminated to have a true live television experience. Variable delay cache 340 in linked list form connects each frame by a pointer structure, wherein a first frame 395 and a second frame 396 in storage device 330 appear to be logically located near each other, or contiguous in storage device 330, but actually first frame 395 and second frame 396 may be located far apart on storage device 330 and are logically linked by pointer reference 397.

Figure 4:
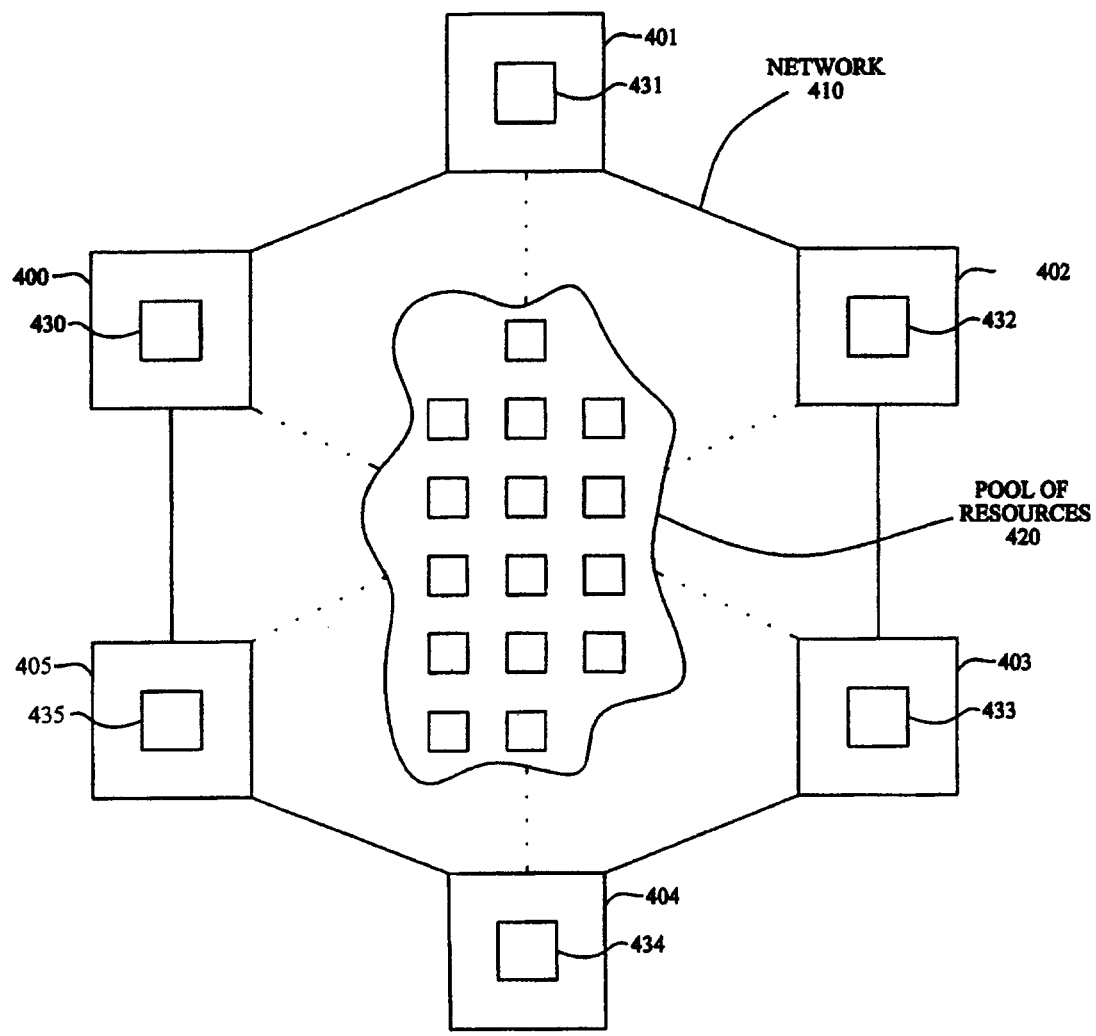
FIG. 4 is a functional block diagram of a network of set-top boxes according to an embodiment of the invention.

FIG. 4 shows a network of set-top boxes according to an embodiment of the present invention. Set-top boxes 400, 401, 402, 403, 404, and 405 are arranged in a network 410. Resources are either used as a pool of resources 420 or as individual separate resources 430, 431, 432, 433, 434, and 435. In one embodiment, the tuners in each set-top box are considered as being in the pool of resources. When a set-top box needs the resource, it is accessed from the pool regardless of the physical location of the resource. In another embodiment, the storage device in each set-top box is considered as individual separate resources. Using various schemes a set-top box will use either the resource local to it, or it will access another storage device resource depending on the situation.

In operation, the set-top box might need a tuner resource in a number of ways. Consider the example of a set-top box having two tuners where a user is currently watching a show and has previously scheduled two shows to be transferred to the hard drive at overlapping time slots. In this case, there will be a point in time where three tuners are needed by the set-top. Consider also the example of a two-tuner box where the user is using a picture-in-picture mode and also is saving a show to the hard drive in the background. In this case three tuners are needed as well and must be accessed using the resources of another connected set-top box.

Figure 5:
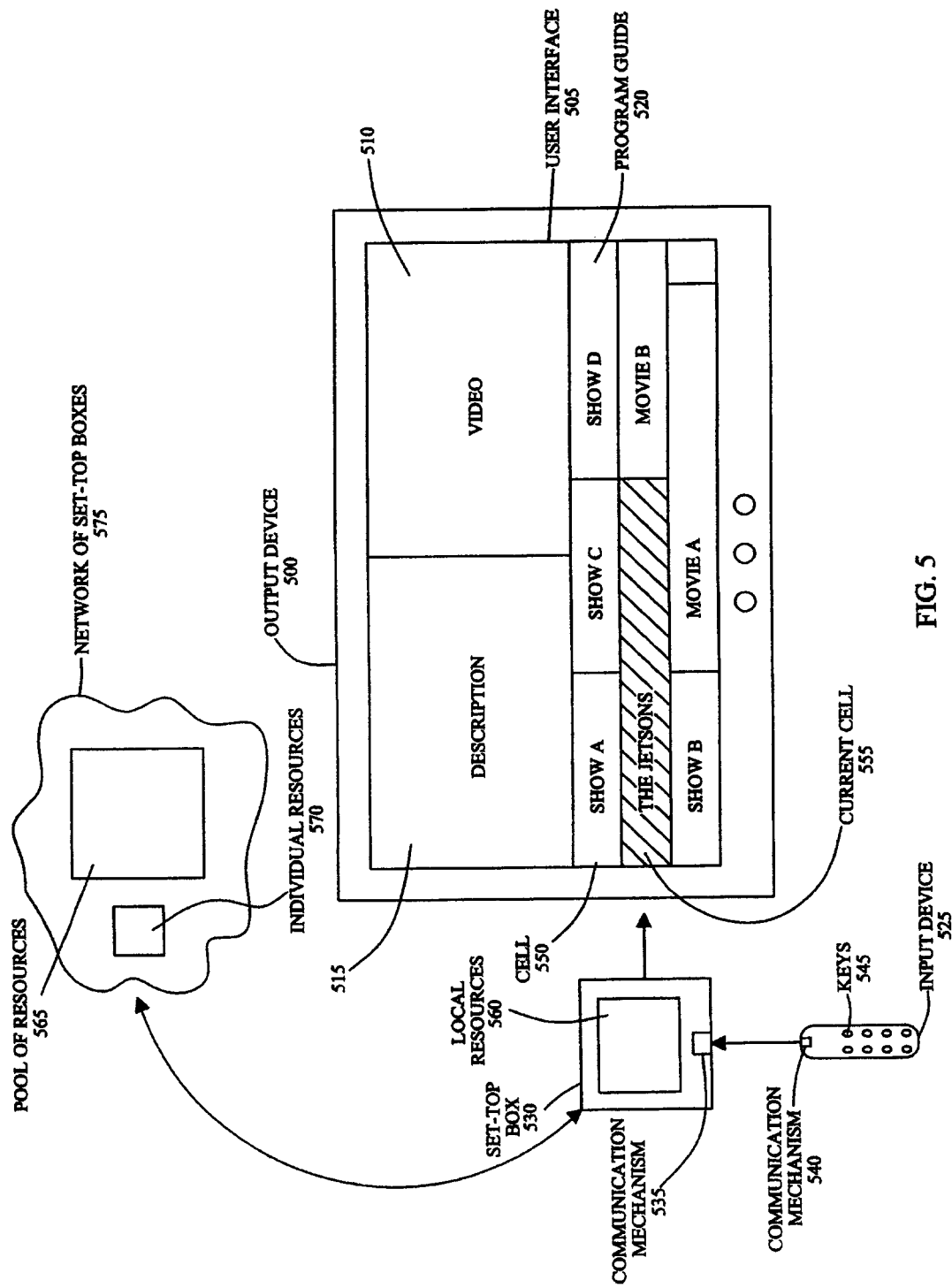
FIG. 5 is a functional block diagram of some of the processes involved in using an embodiment of the present invention.

FIG. 5 is a functional block diagram that describes a circumstance where individual or pooled resources will be shared. Output device 500 is used to display user interface 505. In this example, user interface 505 includes a video portion 510, a description portion 515, and an interactive program guide 520, although all of these elements are not required. Input device 525 is used to communicate with set-top box 530. Typically set-top box has a communication mechanism 535 and input device has a communication mechanism 540 as well. The communication mechanisms may be, for instance, infrared transmitters, radio frequency transmitters, or any other common technology used with remote controls.

By depressing keys 545 on input device 525, a user is able to navigate program guide 520, for instance by moving between cells in the program guide. A user might, for instance, hit a down arrow on input device 525, that would either move a cursor or shift the program guide, so the user interface would change wherein previously highlighted cell 550 would now display current cell 555 as being highlighted. Depending on the implementation, this might in turn cause description 515 to show a program description describing The Jetsons, which might include, for instance, the title, characters, times, the plot of the current episode, the channel, the rating, etc. Also, video portion 510 might display the currently airing episode of the Jetsons, a saved highlight from the show, or alternatively might remain tuned to the program that the user was watching prior to initiating user interface 505.

Keys 545 may also be used to either transfer current cell 555 to the storage device or to schedule current cell 555 for a later transfer to the storage device, if current cell 555 is in a future time slot. Such an action will require set-top box 530 to use its resources now or to schedule its resources for use at a later time. For instance, if current cell 555 is airing now, and the user wants to transfer it to the storage device. The set-top box 530 needs a tuner and the use of a storage device with enough space for the show to be stored. Depending on the load currently in place on set-top box 530, local resources 560, a pool of resources 565 and/or individual resources 570 will be needed.

If set-top box has no available tuners to perform the function requested, it must access pool of resources 565 to use a free tuner from another set-top box in a network of set-top boxes 575 configured to share resources. If set-top box 530 does not have enough space available on its storage device, then individual resources 570 are used, wherein another storage device is used that has enough space. If, however, set-top box 530 has the resources available, it may use local resources 560. The same scenario applies, if current cell 555 is in the future, except then the set-top box 530 schedules the resources for use at a future time. This includes, for instance, determining if a tuner is available locally at that time in the future, and if not scheduling its use from the pool of resources 565. Once a tuner is found to be available in the future, the system may, for instance, generate a list, queue, or other structure, designed to reserve the resource for the scheduled show during the scheduled time slot.

Figure 6:
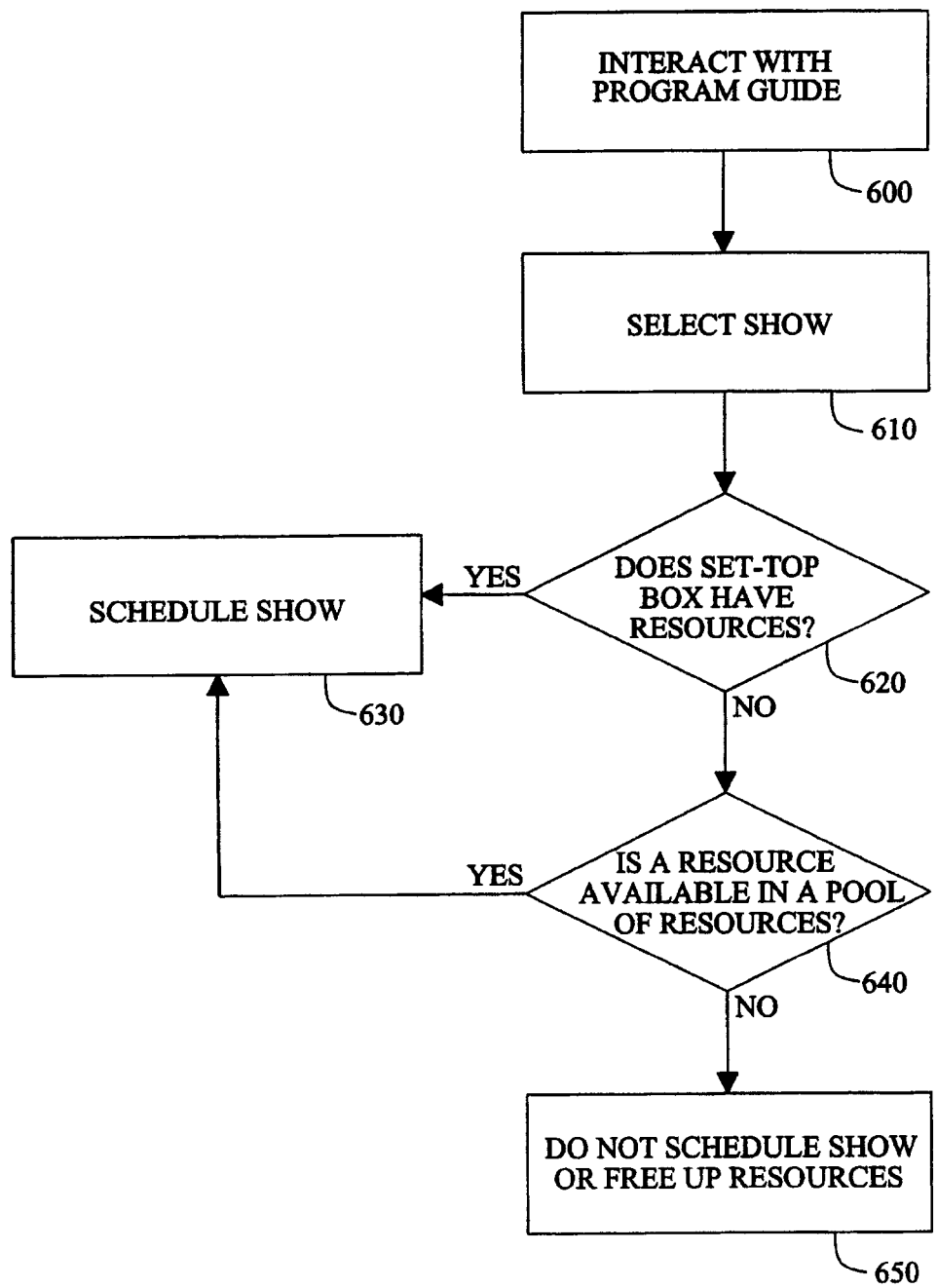
FIG. 6 is a flowchart showing an embodiment of the process of scheduling a show in a shared resource environment.

FIG. 6 is a flowchart showing the steps involved in scheduling the use of a shared resource according to an embodiment of the present invention. At step 600, the user interacts with the program guide. At step 610, the user selects a show. At step 620 it is determined if the set-top box has the resources available at the scheduled time. If so, the show is scheduled at step 630 using the resource. If not, it is determined at step 640 if another resource is available from a pool of resources. If so, flow returns to step 620 where the show is scheduled using the resource. Otherwise, at block 650 the show is not scheduled, since no resource is available. Otherwise, the user may cancel shows that are scheduled to later consume resources and then there will be resources available to schedule the show.

Figure 7:
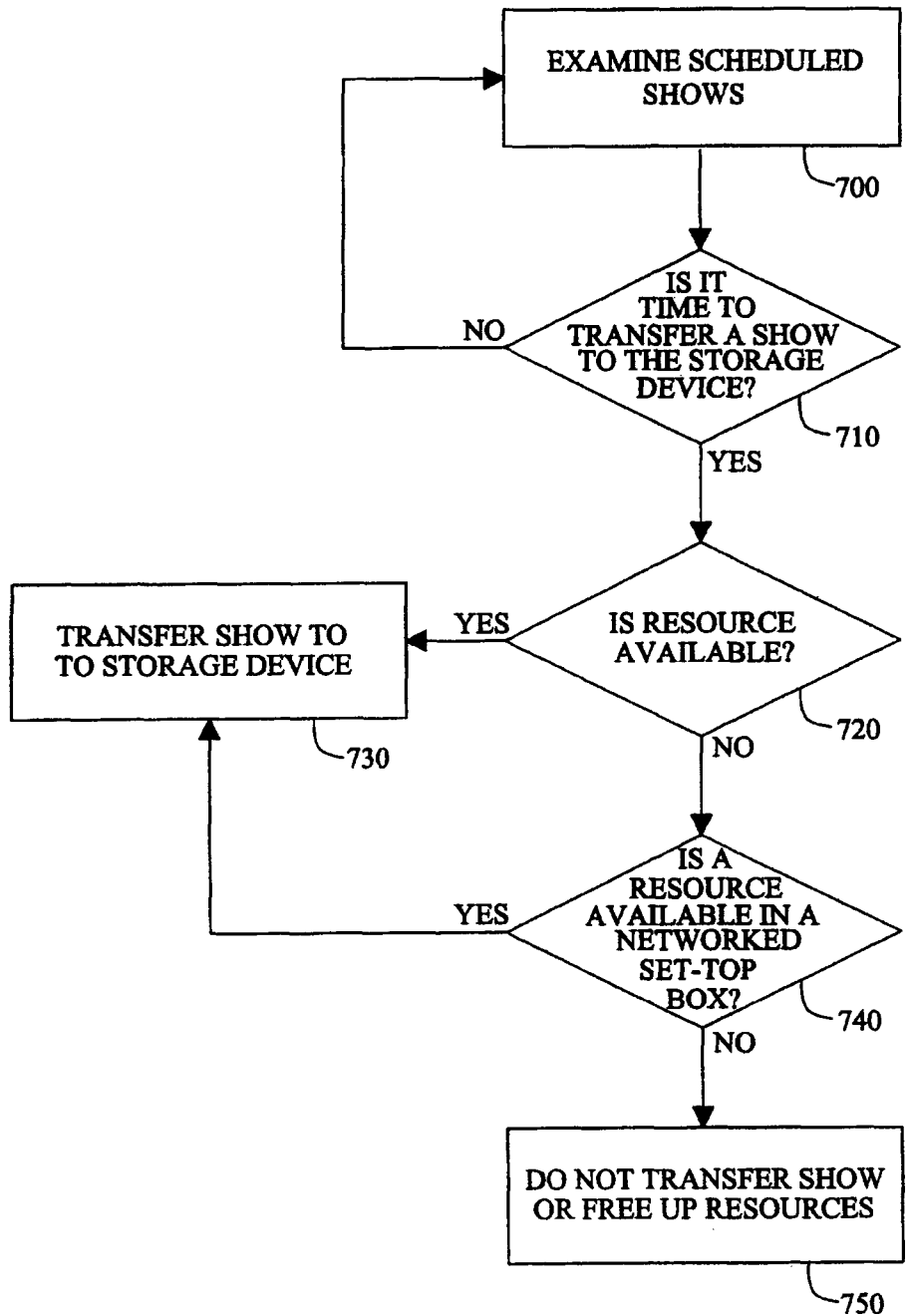
FIG. 7 is a flowchart showing an embodiment of the process of transferring a show to a storage device in a shared resource environment.

FIG. 7 is a flowchart showing the steps involved in using a shared resource to transfer a show to a storage device according to an embodiment of the present invention. At step 700, the system examines the shows that are scheduled to be transferred to the storage device. At step 710, it is determined if it is time to transfer the show to the storage device. If not, then step 700 repeats. Otherwise, it is determined at block 720 if a resource (i.e., a storage device with sufficient space) is available. If so, then at block 730, the show is transferred to the storage device. Otherwise, the resource is not available (i.e., it is full or it does not have enough space for the show), so it is determined at step 740 whether a resource is available in another set-top box connected in the shared network. If so, then flow proceeds back to step 730 where the show is transferred to the storage device. Otherwise, at step 750, the show is not transferred to the storage device. Alternatively, the user may erase shows from a storage device so that there will be resources available to transfer the show.

Figure 8:
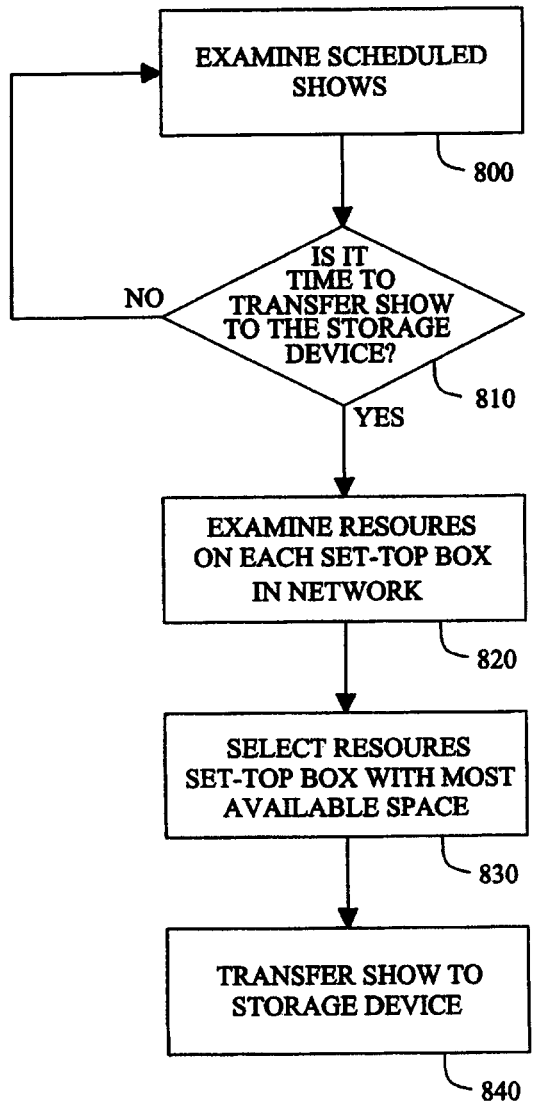
FIG. 8 is a flowchart showing an embodiment of the process of load balancing in a shared resource environment.

FIG. 8 is a flowchart showing the steps involved in balancing the load in resources when they are treated as separate individual resources according to an embodiment of the present invention. At step 800, the system examines the shows that are scheduled to be transferred to the storage device. At step 810, it is determined if it is time to transfer the show to the storage device. If not, then step 800 repeats. Otherwise, at block 820, the individual resources (i.e., hard drives) are examined on each set-top box in the network. At block 830, the resource with the most available space is selected. At block 840, the show is transferred to the selected storage device.

Figure 9:
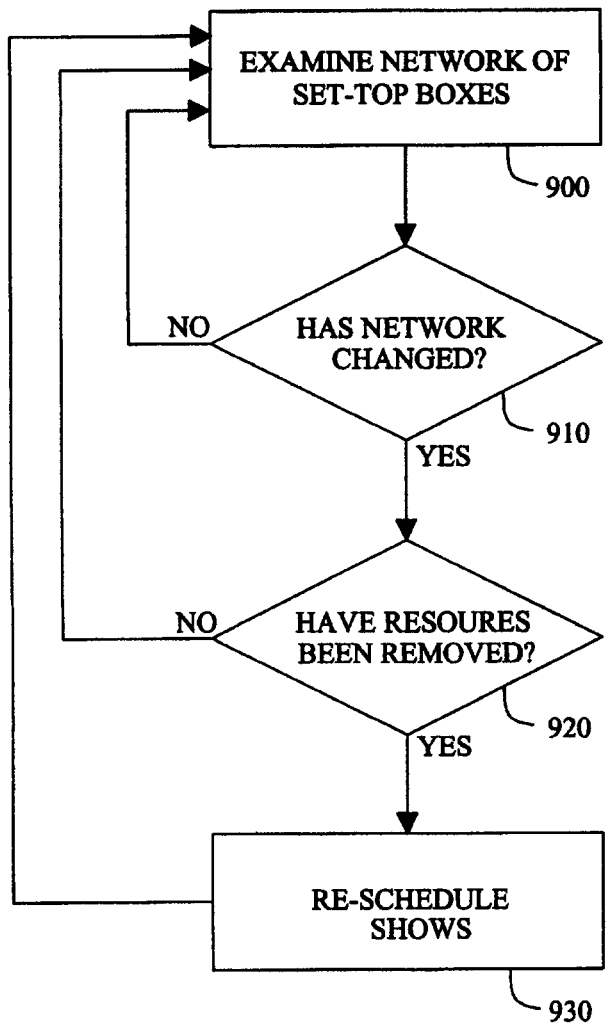
FIG. 9 is a flowchart showing an embodiment of the process of re-configuring a network of set-top boxes after resources are removed from the network.

FIG. 9 is a flowchart showing an embodiment of the process of re-configuring a network of set-top boxes after resources are removed from the network. At block 900, the network of set-top boxes is examined. At block 910 it is determined if the network configuration has changed. For instance, the user may have unplugged and/or removed one of the networked set-top boxes or one of the networked set-top boxes is out of order. If the network has not changed, then the process repeats at block 900 where after a pre-determined amount of time (a few minutes, for instance) the network is examined again.

If however block 910 is true, then it is determined if resources have been removed from the network. If not (i.e., resources have been added to the network), then block 900 repeats again. Otherwise, the shows are re-scheduled at block 930. This includes, for instance, removing lower priority shows from the scheduled if there are insufficient tuner resources to handle the show once the network resources are reduced. Similarly, this might include erasing a show or not transferring a show to a storage device, if such resources are removed.

In one embodiment, the user requests a tuner for recording a specific timeslot. At that point, the set-top box searches all of the hard drives on the network. If the show in that timeslot is found, than the requested tuner is not scheduled to record the timeslot. Otherwise a tuner is obtained by searching for what tuners are available on the network, prioritizing the available tuners by their type, and selecting the highest priority tuner. In one embodiment, each set-top box has a background and a foreground tuner. The box a current user is operating is considered a local box while all others are considered remote. The tuners are prioritized as follows: background remote tuners take precedence over background local tuners, which take precedence over remote foreground tuners, which take precedence over local foreground tuners.

Figure 10:
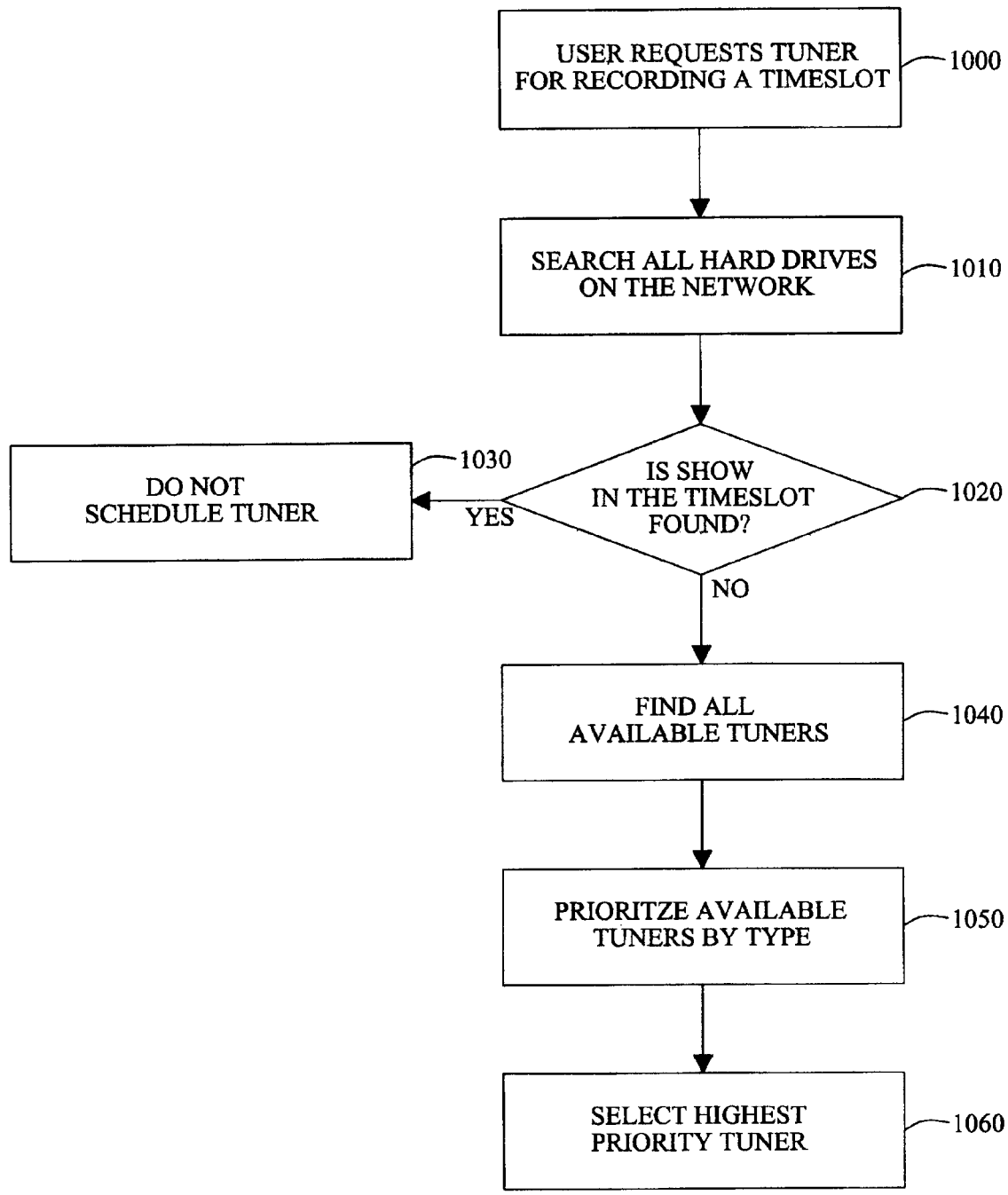
FIG. 10 shows how the system handles a user's request to schedule a timeslot in a shared tuner environment.

FIG. 10 shows how the system handles a user's request to schedule a timeslot in a shared tuner environment. At block 1000, the user requests a tuner for recording a specific timeslot. At block 1010, the set-top box searches all of the hard drives on the network. If the show in that timeslot is found at block 1020 (i.e., it has been recorded previously on one of the boxes), than the requested tuner is not scheduled to record the timeslot at block 1030 (since it is beneficial not to allow redundant shows in the shared hard drive environment. Otherwise, at block 1040 a tuner is obtained by searching for what tuners are available on the network, prioritizing the available tuners by their type at block 1050, and selecting the highest priority tuner 1060.

Figure 11:
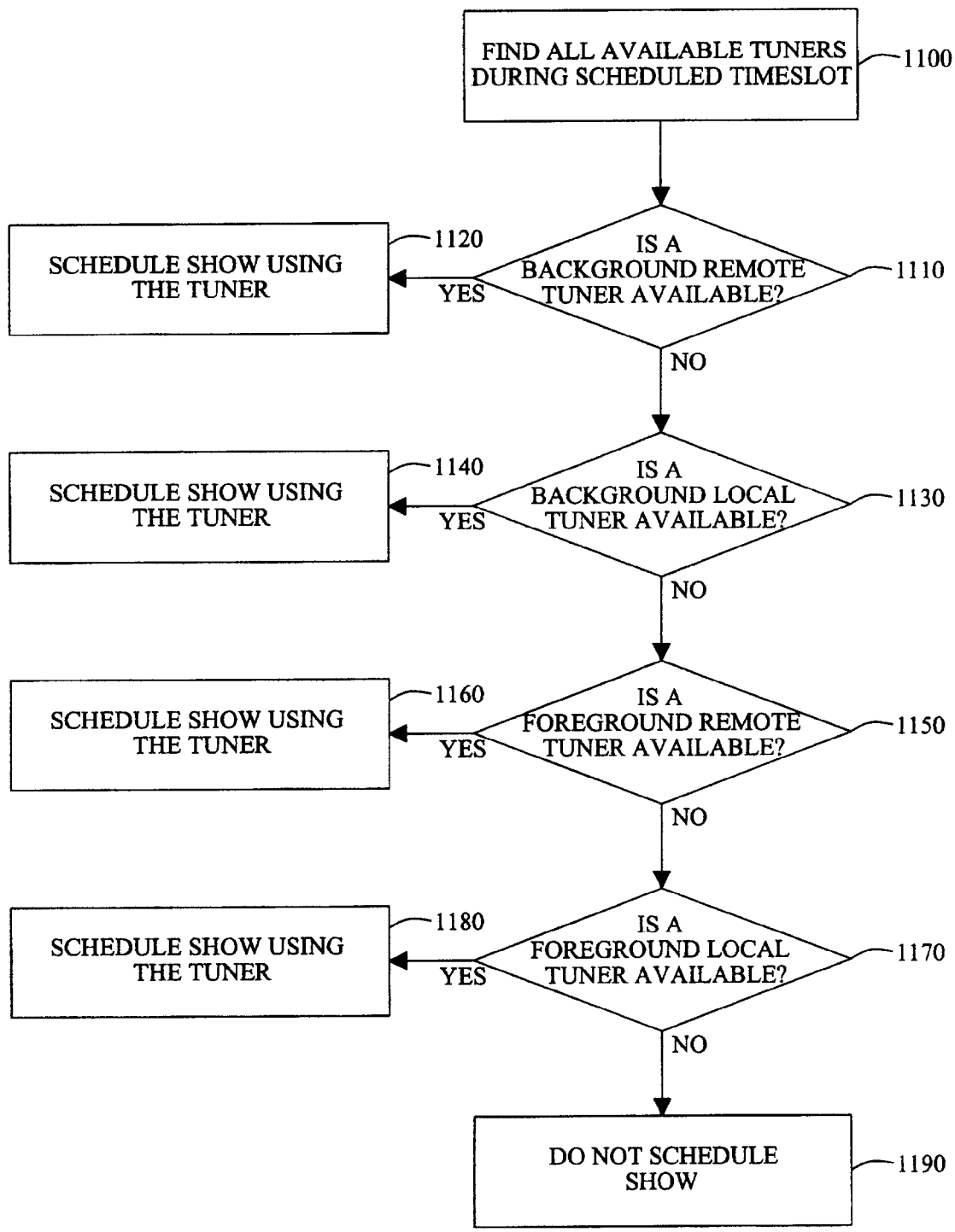
FIG. 11 shows the process of selecting the highest priority available tuner.

In one embodiment, each set-top box has a background and a foreground tuner. The box a current user is operating is considered a local box while all others are considered remote. The tuners are prioritized as follows: background remote tuners take precedence over background local tuners, which take precedence over remote foreground tuners, which take precedence over local foreground tuners. FIG. 11 shows the process of selecting the highest priority available tuner. At block 1100, the system searches for all of the tuners that are available at the time that the timeslot is to be transferred to the storage device. At block 1110, it is determined if a background remote tuner is available. If so, the timeslot is scheduled to use the background remote tuner at block 1120.

Otherwise, at block 1130, it is determined if a background local tuner is available. If so, the timeslot is scheduled to use the background local tuner at block 1140. Otherwise, at block 1150, it is determined if a foreground remote tuner is available. If so, the timeslot is scheduled to use the foreground remote tuner at block 1160. Otherwise, at block 1170 it is determined if a foreground local tuner is available. If so, the timeslot is scheduled to use the foreground local tuner at block 1180. Otherwise, the show is not scheduled at block 1190.

Figure 12:
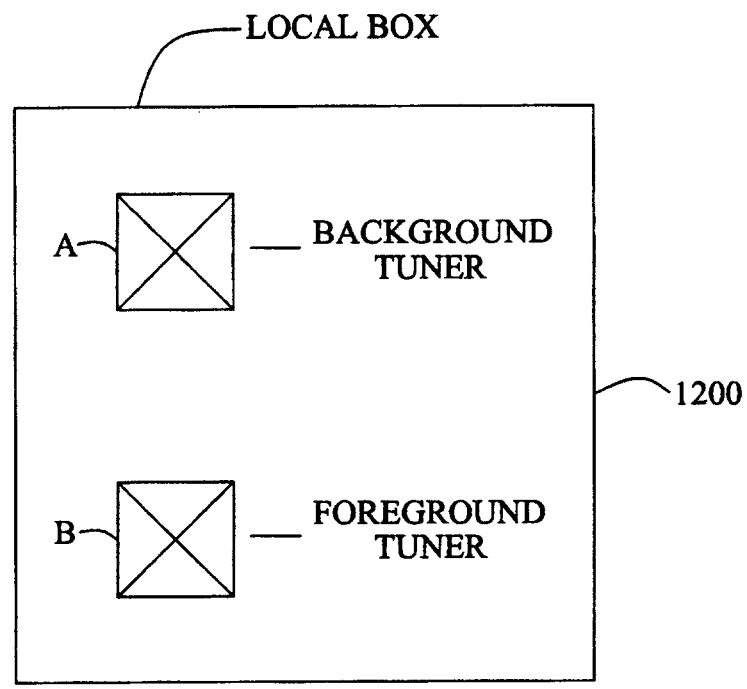
FIG. 12 shows a scenario where permission is required to obtain a remote foreground tuner.
Figure 12:
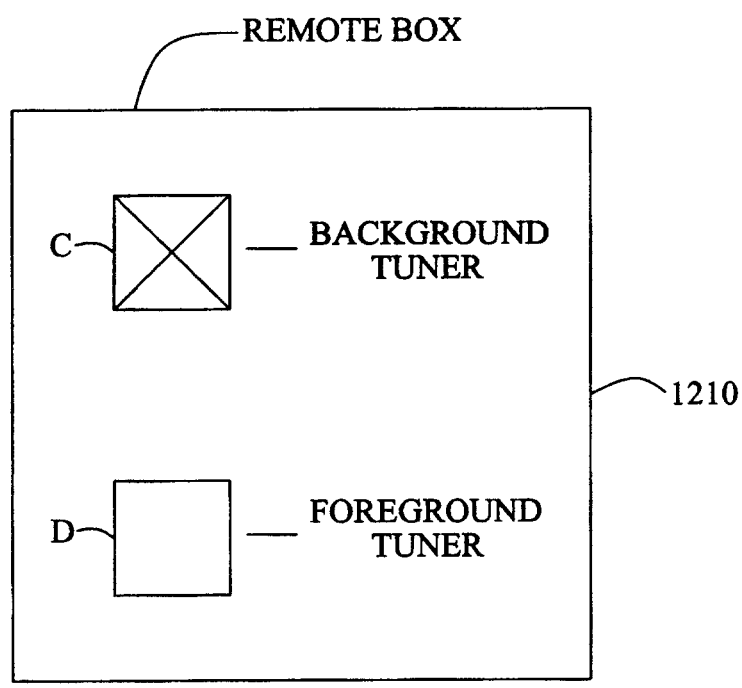

In another embodiment, remote user intervention or non-response is required to obtain a remote foreground tuner when it is being used. For instance, the scenario is described in FIG. 12, where local box 1200 has the background tuner busy with show A and the foreground tuner busy with show B. If the user of local box 1200 wants to record another show, the system might look to remote box 1210, where the background tuner is busy with show A and foreground tuner D is being used by the user of box 1210 to watch TV.

In this scenario, the user watching show D would have to explicitly give box 1200 its foreground tuner, since this would cause the user of box 1210 to no longer be able to watch TV. Alternatively, if box 1210 is on and the foreground tuner is showing show D, but no one is in the room, a period of non-intervention (i.e., no person is at box 1210 to deny permission to use the foreground tuner) or other method is used to determine that the box is really idle and the foreground tuner can be used by box 1200.

Figure 13:
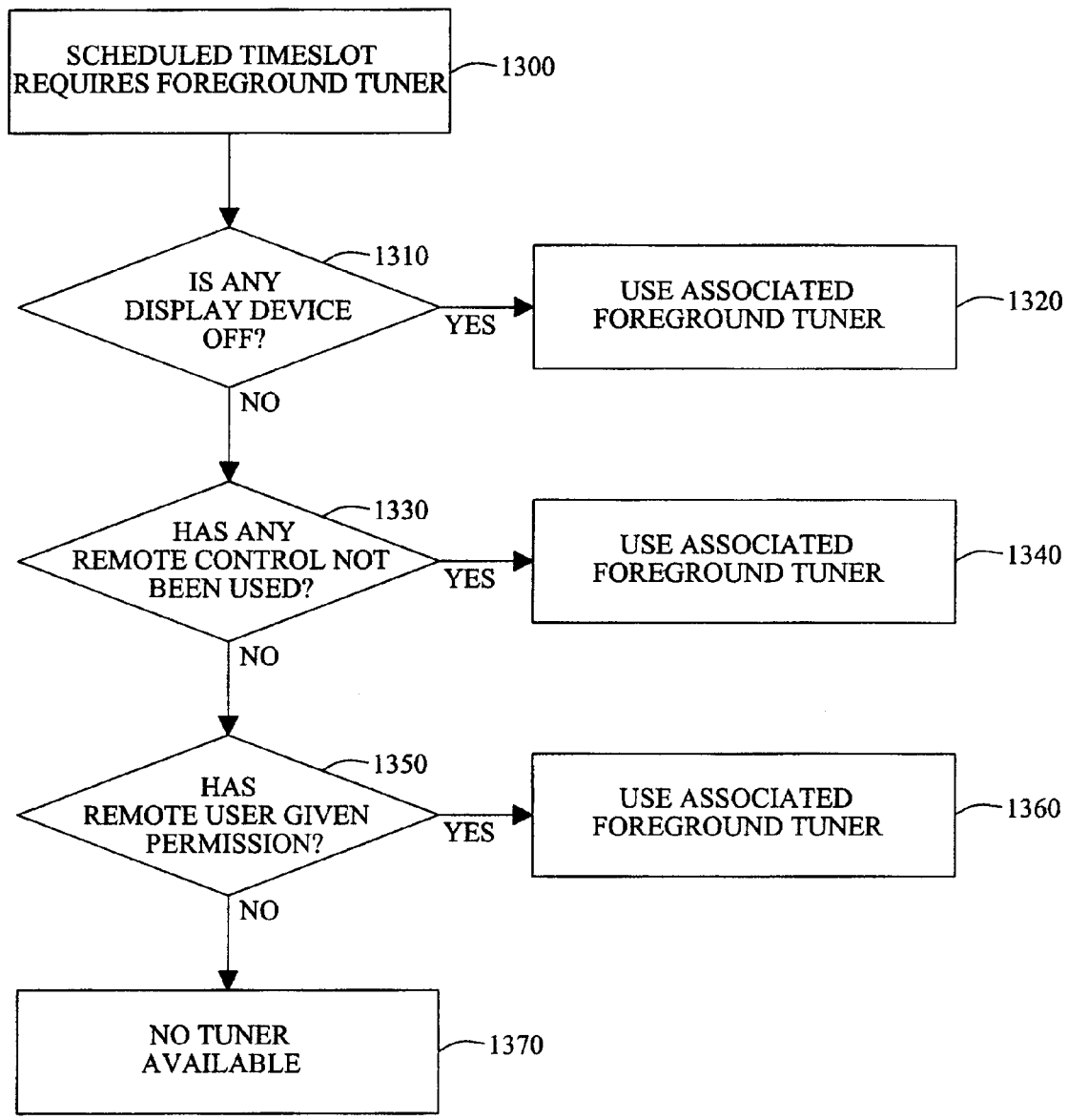
FIG. 13 is an algorithm to determine if a used remote foreground tuner is in use but is available.

FIG. 13 is an algorithm whereby the system determines that a used remote foreground tuner is really available (i.e., no user is actually watching TV or gives permission) and hence the tuner can be obtained. At block 1300, a scheduled timeslot requires the use of a foreground tuner on the network (i.e., all background tuners are unavailable). At block 1310, all televisions or other display devices on the network are queried to determine if they are off. If a display device is off, then at block 1320, the associated foreground tuner with the off display is used. Otherwise, at block 1330, all remote controls associated with display devices are queried to determine if they have been used since the display device was turned on. If not, the associated foreground tuner is used at block 1340. Otherwise, at block 1350, it is determined if a user has given permission to use their foreground tuner. If so, that tuner is used at block 1360. Otherwise no tuner is available for scheduling 1370.

Alternatively, one might look to the remote controls for other factors such as, how long they have not been used, where the system might determine they are not in use by passing a certain amount of time without being used. Although the description above contains many specificities, these should not be construed as limiting the scope of the invention but as merely providing illustrations of some of the presently preferred embodiments of this invention. Thus the scope of this invention should be determined by the appended claims and their legal equivalents.

The invention claimed is:

1. A method for using a network of set-top boxes, the method comprising:

receiving a request to record a future broadcast of a program in a first set-top box, wherein said first set-top box includes a first storage device, wherein said first set-top box is coupled, over said network, to a second set-top box, and wherein the second set-top box includes a second storage device;

in response to receiving the request to record the future broadcast of the program, querying said network, with said first set-top box, to determine whether a past broadcast of said program has previously been recorded in said second storage device included in said second set-top box, wherein the past broadcast of the program is an earlier instance of the program transmitted from a source to the second set-top box during a timeslot different from a timeslot during which a later instance of the future broadcast of the program is transmitted from the source to the first set-top box;

when said query indicates that the past broadcast of said program is stored in said second storage device, accessing said program stored on said second storage device over said network with said first set-top box in response to receiving said recording request; and otherwise, using at least one of said first and said second storage devices in response to receiving said recording request.

2. The method of claim 1 wherein said first set-top box uses said first storage device when said first storage device is available, and attempts to use said second storage device when said first storage device is not available.

3. The method of claim 1 wherein said first set-top box determines whether said first storage device or said second storage device has more space available and uses the one of said first and second storage devices that has more space available.

4. The method of claim 1 further comprising, when said program is not stored in said second storage device:
examining said first storage device to determine whether said first storage device has enough space available for said program;
recording said program to said first storage device, when there is enough space available for said program;
examining said second storage device to determine whether said second storage device has sufficient space available, when enough space was not available on said first storage device; and
recording said program to said second storage device, when there is sufficient space available for said program on said second storage device and not on said first storage device.

5. The method of claim 1, further comprising recording said program to said second storage device prior to receiving said recording request in said first set-top box.

6. The method of claim 1, wherein accessing said program stored on said second storage device comprises retrieving, over said network, said program from said second storage device, with said first set-top box.

7. The method of claim 1, wherein accessing said program stored on said second storage device comprises displaying said program with said first set-top box.

8. A network of set-top boxes, comprising:
a network;
a first set-top box that includes a first storage device connected in said network, wherein said first set-top-box is coupled, over said network, to a second set-top box that includes a second storage device, wherein each of said first and second storage devices is capable of storing programs and is available to said network; and
a processor on said first set-top box, said processor being configured to:
receive a request to record a future broadcast of a program;
in response to receiving the request to record the future broadcast of the program, transmit a query to said network to determine whether a past broadcast of said program has previously been recorded in said second storage device included in said second set-top box, wherein the past broadcast of the program is an earlier instance of the program transmitted from a source to the second set-top box during a timeslot different from a timeslot during which a later instance of the future broadcast of the program is transmitted from the source to the first set-top box;
access the past broadcast of said program stored on said second storage device over said network with said first set-top box in response to receiving said recording request when said query indicates that said program is stored in said second storage device; and
otherwise, use at least one of said first and second storage devices in response to receiving said recording request.

9. The network of claim 8 wherein said first set-top box uses said first storage device when said first storage device is available, and attempts to use said second storage device when said first storage device is not available.

10. The network of claim 8 wherein said first set-top box determines whether said first storage device or said second storage device has more space available and uses the one of said first and second storage devices that has more space available.

11. The network of claim 8, further comprising a processor on said second set-top box, configured to receive a recording request prior to receiving said recording request in said first set-top box.

12. The network of claim 8, wherein said processor is further configured to retrieve, over said network, said program from said second storage device when said query indicates that said program is stored in said second storage device.

13. The network of claim 8, wherein said processor is further configured to display said program when said query indicates that said program is stored in said second storage device.

14. A network of set-top boxes, comprising:
means for receiving a request to record a future broadcast of a program in a first set-top box, wherein said first set-top box includes a first storage device, wherein said first set-top box is coupled, over said network, to a second set-top box, and wherein the second set-top box includes a second storage device;
means for, in response to receiving the request to record the future broadcast of the program, querying said network, with said first set-top box, to determine whether a past broadcast of said program has previously been recorded in said second storage device included in said second set-top box, wherein the past broadcast of the program is an earlier instance of the program transmitted from a source to the second set-top box during a timeslot different from a timeslot during which a later instance of the future broadcast of the program is transmitted from the source to the first set-top box;
means for accessing the past broadcast of said program stored on said second storage device over said network with said first set-top box in response to receiving said recording request when said query indicates that said program is stored in said second storage device; and
otherwise, means for using at least one of said first and second storage devices in response to receiving said recording request.

15. A computer program product comprising:
a non-transitory computer usable medium having computer readable program code embodied therein for causing a computer to:
receive, during a time interval, a request to record a future broadcast of a program in a first set-top box, wherein said first set-top box includes a first storage device, wherein said first set-top box is coupled, over said network, to a second set-top box, and wherein the second set-top box includes a second storage device;
in response to receiving the request to record the future broadcast of the program, query said network, with said first set-top box, to determine whether a past broadcast of said program has previously been recorded in said second storage device included in said second set-top box, wherein the past broadcast of the program is an earlier instance of the program transmitted from a source to the second set-top box during a timeslot different from a timeslot during which a later instance of the future broadcast of the program is transmitted from the source to the first set-top box;

access the past broadcast of said program stored on said second storage device over said network with said first set-top box in response to receiving said recording request when said query indicates that said program is stored in said second storage device; and otherwise use at least one of said first and said second storage devices in response to receiving said recording request.

16. The computer program product of claim 15 wherein said first set-top box uses said first storage device when said first storage device is available, and attempts to use said second storage device when said first storage device is not available.

17. The computer program product of claim 15 wherein said first set-top box determines whether said first storage device or said second storage device has more space available and uses the one of said first and second storage devices that has more space available.

18. The computer program product of claim 15 wherein said computer readable program code further causes said computer to:

when said program is not stored in said second storage device, examine said first storage device to determine whether said first storage device has enough space available for said program;

when said program is not stored in said second storage device, record said program to said first storage device, when there is enough space available for said program;

when said program is not stored in said second storage device, examine said second storage device to determine whether said second storage device has enough space available, when enough space was not available on said first storage device; and when said program is not stored in said second storage device, record said program to said second storage device, when there is enough space available for said program on said second storage device and not on said first storage device.

19. The computer program product of claim 15, wherein said computer readable program code further causes said computer to record said program to said second storage device prior to receiving the recording request in said first set-top box.

20. The computer program product of claim 15, wherein said computer readable program code causes the a computer to access said program by causing the computer to retrieve, over said network, said program from said second storage device, with said first set-top box.

21. The computer program product of claim 15, wherein said computer readable program code causes the computer to access said program by causing the computer to display said program with the first set-top box.

22. A method for using a network of user equipment devices, the method comprising:

receiving a request to record a future broadcast of a program in a first user equipment device, wherein said first user equipment device includes a first storage device, wherein said first user equipment device and said first storage device are coupled to said network;

in response to receiving the request to record the future broadcast of the program, querying said network, with said first user equipment device, to determine whether a past broadcast of said program has previously been recorded in a second storage device included in a second user equipment device, wherein said second user equipment device and said second storage device are coupled to said network, wherein the past broadcast of the program is an earlier instance of the program transmitted from a source to the second user equipment device during a timeslot different from a timeslot during which a later instance of the future broadcast of the program is transmitted from the source to the first user equipment device; and using at least one of said first and said second storage devices in response to receiving said recording request.

* * * * *

UNITED STATES PATENT AND TRADEMARK OFFICE
CERTIFICATE OF CORRECTION

PATENT NO. : 8,528,015 B2
APPLICATION NO. : 10/708529
DATED : September 3, 2013
INVENTOR(S) : Bumgardner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1134 days.

Signed and Sealed this
Twenty-third Day of May, 2017

Michelle K. Lee
*Director of the United States Patent and Trademark Office*